J. TRUST.
VEGETABLE AND FRUIT PEELING MACHINE.
APPLICATION FILED OCT. 31, 1914. RENEWED OCT. 12, 1916.
1,226,418.
Patented May 15, 1917.
5 SHEETS—SHEET 1.
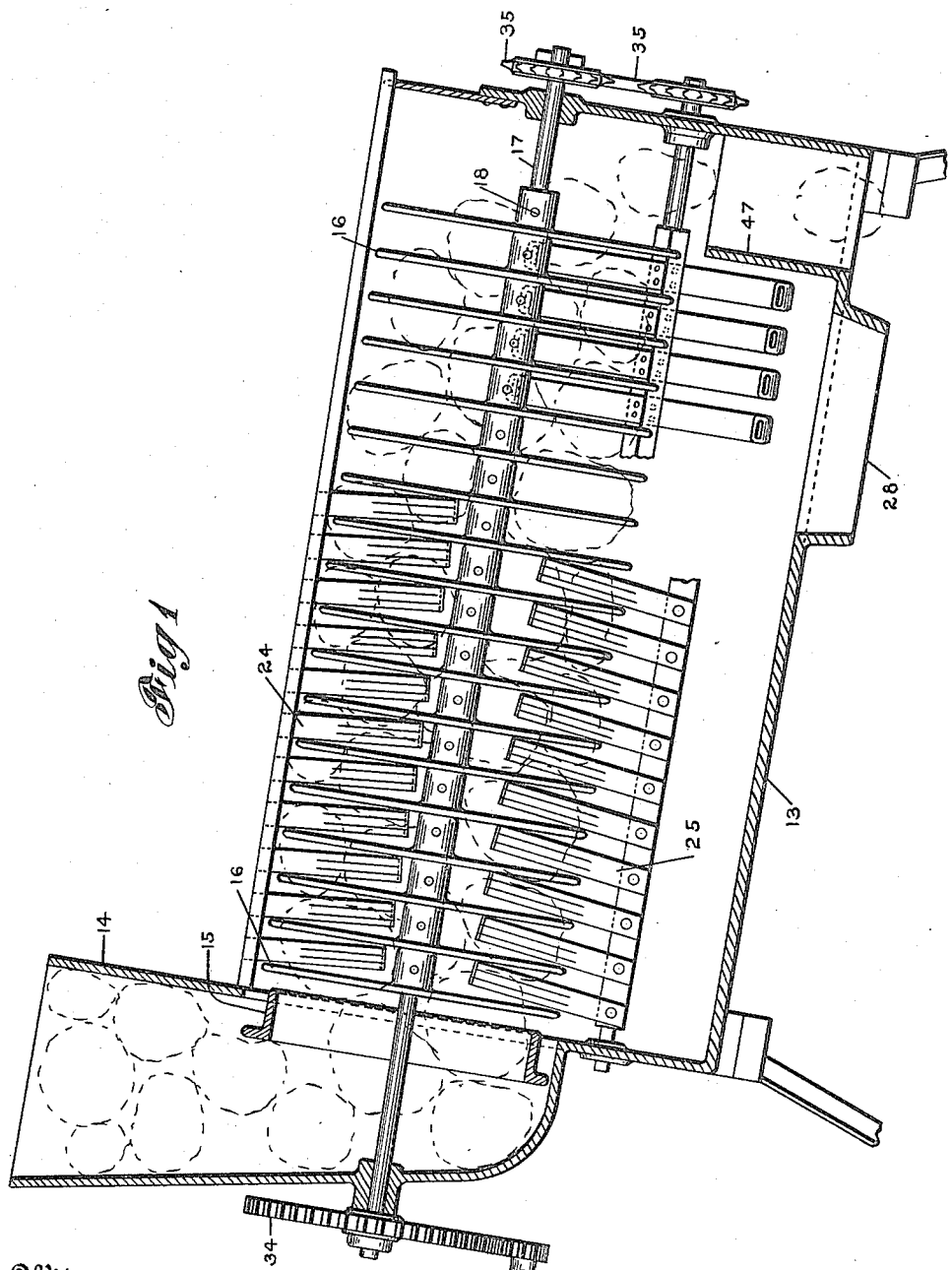

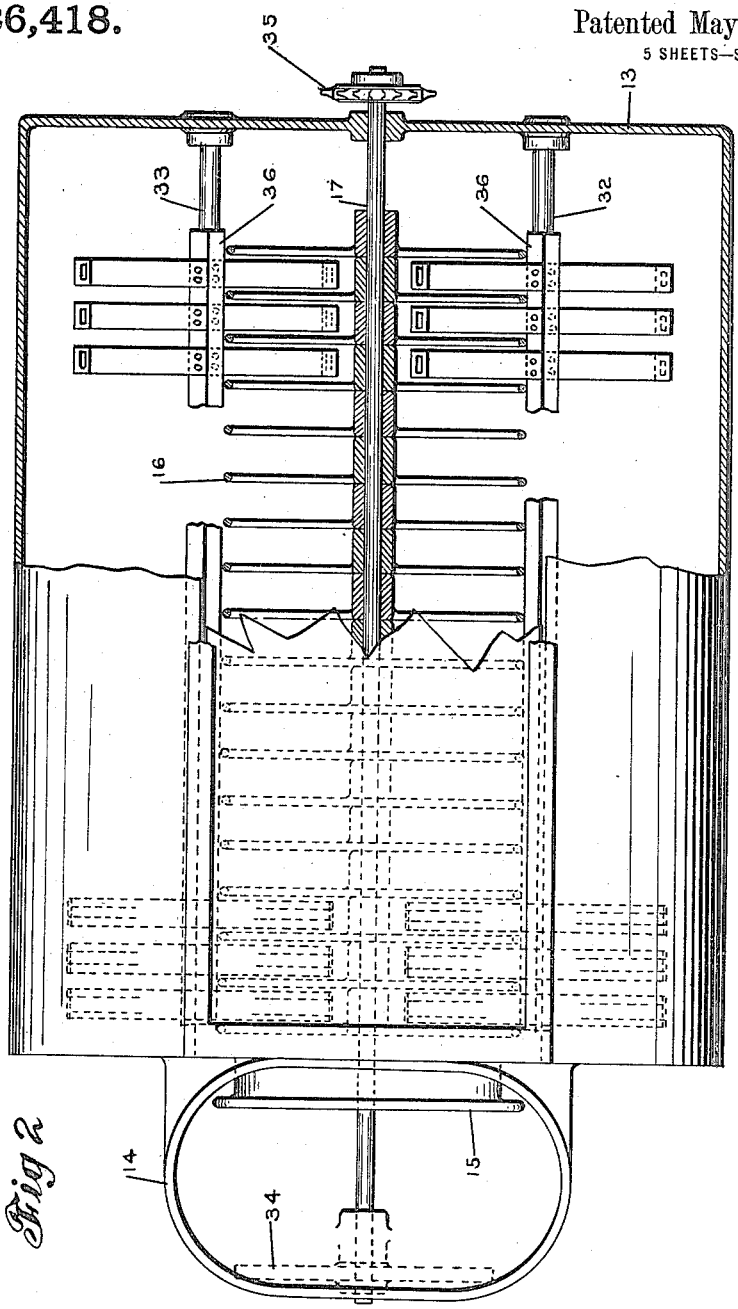

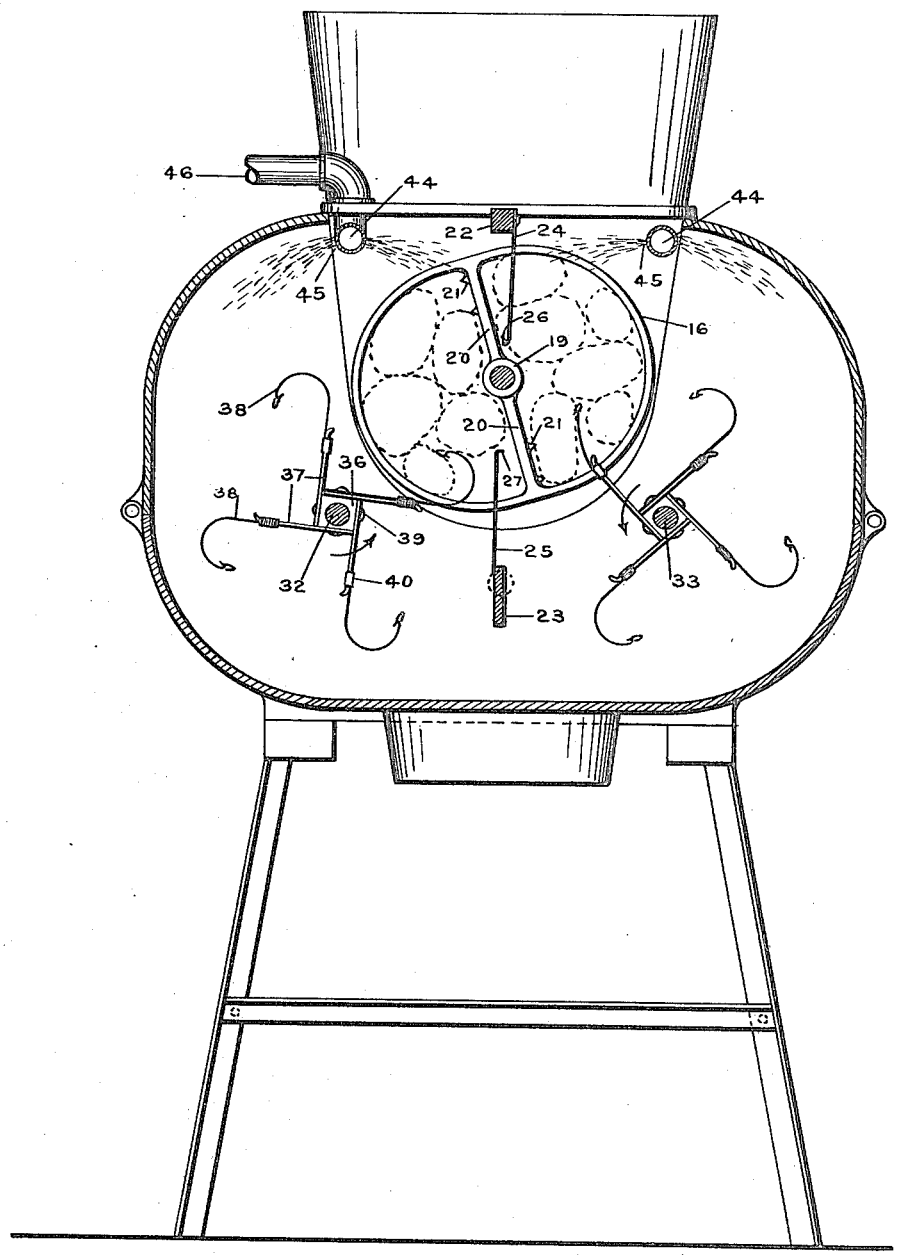

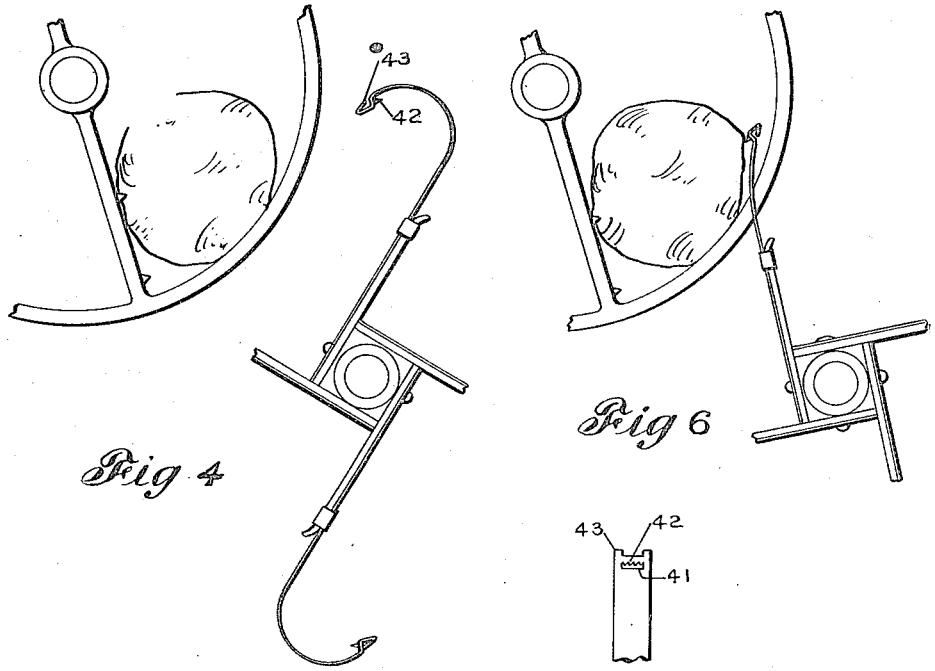
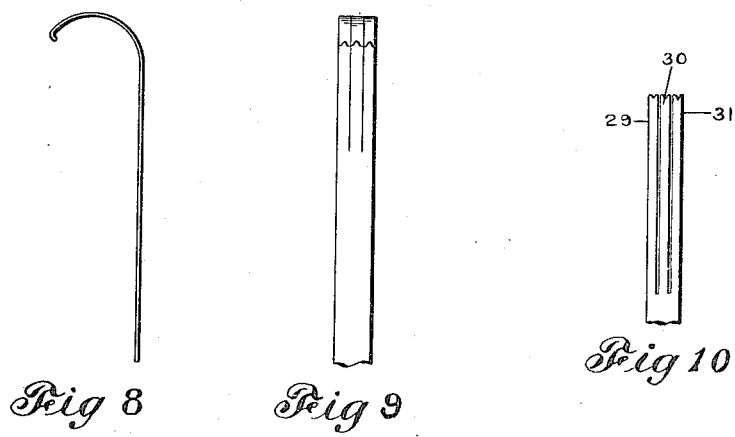

J. TRUST.
VEGETABLE AND FRUIT PEELING MACHINE.
APPLICATION FILED OCT. 31, 1914. RENEWED OCT. 12, 1916.

1,226,418.

Patented May 15, 1917.
5 SHEETS—SHEET 5.

Witnesses:
Louise Enderli
David H. Douglass

Inventor
Josephine Trust

By her Attorney

UNITED STATES PATENT OFFICE.

JOSEPHINE TRUST, OF BROOKLYN, NEW YORK.

VEGETABLE AND FRUIT PEELING MACHINE.

1,226,418.  Specification of Letters Patent.  Patented May 15, 1917.

Application filed October 31, 1914, Serial No. 869,513. Renewed October 12, 1916. Serial No. 125,286.

*To all whom it may concern:*

Be it known that I, JOSEPHINE TRUST, a citizen of the United States, residing at the borough of Brooklyn, in the county of Kings and State of New York, have invented certain new and useful Improvements in Vegetable and Fruit Peeling Machines, of which the following is a specification, reference being had therein to the accompanying drawing.

My invention relates to improvements in vegetable and fruit peeling apparatus, and has for its principal object certain details of construction embracing a new principle of operation by means of which a complete removal of the outer skin or peel of the fruit or vegetable is insured without undue marking or cutting away of the fruit or vegetable.

Figure 11:
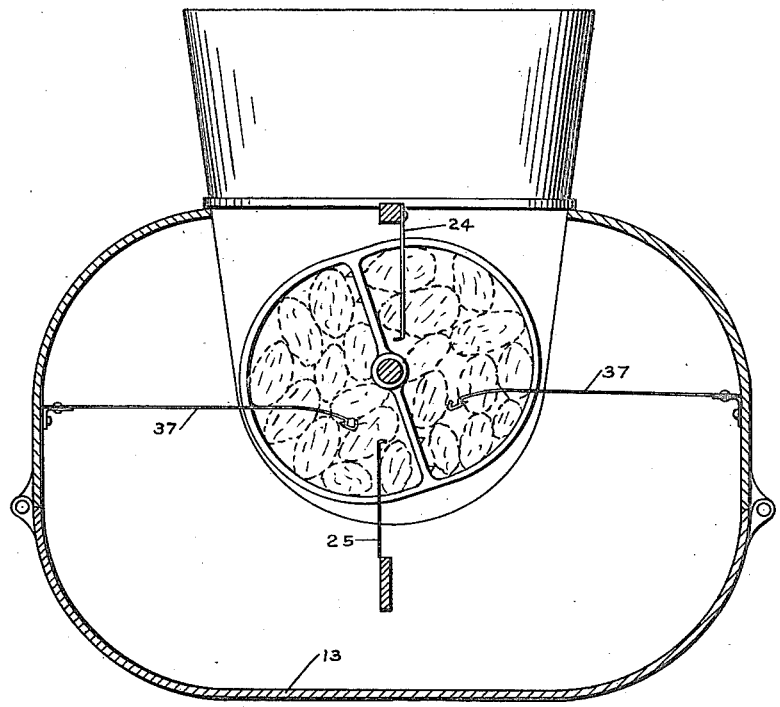
Figure 12:
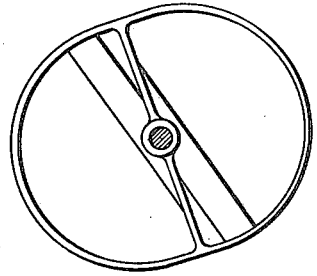

Referring to the accompanying drawings, Figure 1 illustrates a longitudinal sectional view with parts broken away showing one application of my invention. Fig. 2 is a plan view of a machine partly broken away such as shown in Fig. 1, and Fig. 3 a cross sectional view of such a machine. Fig. 4 is an enlarged detail of the carrier mechanism showing a potato in position therein. Fig. 5 an enlarged detail of one of the cutting mechanisms. Fig. 6 a combination view of Figs. 4 and 5 showing the relative position of one of the knives while in the act of cutting away the skin or peel of the potato. Fig. 7 is an enlarged detail in plan view showing the end of one of the knives such as illustrated in Figs. 5 and 6. Fig. 8 illustrates a side view of one of the stationary knives. Fig. 9 a front elevation of the same, and Fig. 10 a similar view to Fig. 9 with the end of the knife laid out flat. Fig. 11 is a similar view to Fig. 3 showing certain modifications, and Fig. 12 is a plan view showing certain modifications of the fruit or vegetable carrying frame.

13 is the main chamber of the apparatus which is fed through the hopper 14 into which the potatoes or other vegetable or fruit are introduced. The same are fed by gravity through the centralizing guide 15 which it will be observed is concentric with the frames such as 16 mounted upon the shaft 17 by any suitable means such as the binding screws 18. These frames are shown to better advantage in Fig. 3 in which it will be seen that they are preferably oval in cross section and are provided with central bearings such as 19 secured by the connecting bars 20. Opposite sides of opposite connecting bars 20 are also preferably provided with teeth such as 21 which are adapted to penetrate the surface of the potato to hold the same from shifting while being acted upon by the knives although as will be hereinafter disclosed, the potato is in fact adapted to shift in a general rotary and forward manner through the machine.

Within the chamber 13 is also preferably longitudinally secured suitable supports or bars such as 22—23 upon which is preferably secured cutters such as 24—25 respectively having turned over cutting edges as indicated at 26—27 so that as the potatoes advance rightwardly through the machine shown in Fig. 1, the skin of the potato is engaged by the opposite knife edges 26—27 and thrown therefrom dropping into the bottom of the chamber 13 and discharging through the opening 28 in the base thereof.

The knives such as 24—25 it will be observed are not mounted at right angles as shaft 17 but are projected slightly rightwardly. It will also be observed more particularly with reference to Figs. 8 to 10 inclusive that the cutting fingers such as 29—30 and 31 of the knives though parallel and preferably of equal length are preferably resilient and independently movable so that as the potato revolves within the frames such as 16 the fingers engage the potato thereby imparting thereto a rotational movement about an axis at right angles to the axis 17 and at right angles to the path of the potato in being carried within the frames 16, thus insuring contact with every point on the surface of the potato and insuring a complete removal of the skin or peel therefrom, allowing the ends of the fingers such as 29 to 31 inclusive because of their resilient character, to ride down into any depressions or recesses of the potato so as to cut out the eyes and insure a clean peeling.

Referring now to Fig. 3 it will be observed that two other shafts such as 32—33 are adapted to be rotated by the main gear 34 mounted upon the shaft 17 which carries sprocket and chain 35—35′ or other suitable connection. Upon the said shafts 32—33 may be mounted suitable supporting blocks such as 36 provided with arms such as 37 to which may be secured knives such as 38 by means of a rivet, screw or other suitable fastening at the base such as 39 and by means of the adjustable ring such as 40 to vary the resiliency or action of said knives. A plan view of one of these knives is shown to better advantage in Fig. 7 in which it will be seen that a suitable cut away portion such as 41 may be provided, one side of which is preferably provided with teeth such as 42 which insures engagement with the skin of the fruit or vegetable. The end of the knife it will be observed terminates in a return portion 43 which strengthens and reinforces the same and which may be formed out of the same piece or may be suitably secured thereto by solder or other suitable means. As the knives 38 rotate in opposite directions, the ends of the same pass between the potatoes and between the adjacent rings or frames 16 within which the potatoes travel and tear the skin from the potato as the same leaves contact therewith and continues in its path of rotation.

While I have illustrated and suggested that the knives 37 may be rotated as aforesaid, I do not wish it to be understood that this invention is so limited as I have found that very good results may be obtained without the use of the knives 37 or any other parts associated therewith and have found by eliminating the same I am still nevertheless able to peel potatoes completely and cleanly by the use of the stationary knives 24—25. However, the knives 37 may be mounted as shown in Fig. 11 wherein it will be observed that these knives are mounted permanently within the chamber 13 and have no movement except that permitted by virtue of their resiliency and by virtue of their contact with the revolving fruit or vegetables within the rotating frames.

For the purpose of cleaning out the interior of the machine I may provide any suitable means such as the longitudinally mounted pipes 44 provided with spraying nozzles such as 45 through which water or any other material may be fed as by the pipe 46 and allowed to drain with the peels through the discharge opening 28 at the bottom, the potatoes as peeled being preferably discharged through the chamber 47 from which point they may be caught in a tub, barrel or other receptacle at the lower end of the machine.

Of course it will be understood that various modifications may be made in the construction and details of the various parts of the apparatus without departing from the spirit of the invention as claimed.

I claim:

1. In an apparatus of the class described, the combination of a rotary feeding device, stationary stripping mechanism coöperating with said feeding device, said stripping mechanism including flexible arms adapted to coöperate with the vegetables, said arms having cutting portions adapted to catch the skin and tear the same from the vegetables, and means to operate said feeding device, said flexible arms provided with fingers of equal length and mounted so that said fingers engage the skin of said vegetables successively, and means in combination with said rotary feeding device for controlling the movement of said vegetables while passing therethrough and while being operated upon by said cutting portions.

2. In an apparatus of the class described, a conveyer comprising a series of rotatable rings through which the vegetables are adapted to be fed, and fixed resilient cutting members projecting between said rings adapted to operate upon said vegetables as the same are fed through said rings, and means in combination with the last of said rings for retarding the discharge of the vegetables therefrom.

In testimony whereof I hereunto affix my signature in the presence of two witnesses.

JOSEPHINE TRUST.

Witnesses:
LOUISE ENDERLE,
THOMAS A. HILL.

Copies of this patent may be obtained for five cents each, by addressing the "Commissioner of Patents, Washington, D. C."